United States Patent [19]

Contzen et al.

[11] Patent Number: 4,986,636
[45] Date of Patent: Jan. 22, 1991

[54] VIEWING GLASS FOR VACUUM APPARATUS

[75] Inventors: Franz-Peter Contzen; Katrin Wilmers, both of Colonge, Fed. Rep. of Germany

[73] Assignee: Leybold AG, Fed. Rep. of Germany

[21] Appl. No.: 400,704

[22] Filed: Aug. 30, 1989

[30] Foreign Application Priority Data

Sep. 12, 1988 [DE] Fed. Rep. of Germany ... 8811508[U]

[51] Int. Cl.⁵ .......................... B65D 25/54; G02B 7/00
[52] U.S. Cl. ..................................... 350/319; 350/589; 220/663; 73/334
[58] Field of Search ........................ 350/319, 252, 589; 73/334, 326, 328, 329, 330, 331; 220/82 A, 663; 116/276; 137/559

[56] References Cited

U.S. PATENT DOCUMENTS

| | | | |
|---|---|---|---|
| 2,942,469 | 6/1960 | LeRoy | 73/334 |
| 3,556,038 | 1/1971 | Wolfe | 350/319 |
| 3,625,390 | 12/1971 | Meginnis | 73/334 X |
| 3,880,005 | 4/1975 | Butterfield et al. | 73/334 |
| 3,922,999 | 12/1975 | Meginnis | 73/319 X |
| 4,182,179 | 1/1980 | Meginnis | 73/334 |
| 4,807,474 | 2/1989 | Foster | 73/331 |

FOREIGN PATENT DOCUMENTS

| | | |
|---|---|---|
| 0253561 | 1/1988 | European Pat. Off. |
| 1099034 | 2/1961 | Fed. Rep. of Germany |
| 1998808 | 12/1968 | Fed. Rep. of Germany |
| 2133777 | 1/1973 | Fed. Rep. of Germany |
| 2345680 | 3/1975 | Fed. Rep. of Germany |
| 2600553 | 11/1977 | Fed. Rep. of Germany |
| 2606246 | 2/1978 | Fed. Rep. of Germany |
| 1568477 | 5/1969 | France |
| 2348738 | 11/1977 | France |
| 141781 | 4/1920 | United Kingdom ................. 73/334 |

OTHER PUBLICATIONS

"Transactions of the ASME" Journal of Engineering for Industry, Published Quarterly by the American Society of Mechanical Engineers, Nov. 1971, pp. 943-952.

Primary Examiner—Bruce Y. Arnold
Assistant Examiner—David R. Parsons
Attorney, Agent, or Firm—Hill, Van Santen, Steadman & Simpson

[57] ABSTRACT

The invention is directed to a viewing glass having a transparent pane and a pair of flanges. In order to facilitate simple manufacture of the viewing glass, it is proposed that the pane be arranged in an inside step of the one of the flanges and be surrounded by an O-ring for producing a vacuum-tight connection. The edge of the pane and the step of the flange preferably have corresponding frustoconical surfaces.

8 Claims, 1 Drawing Sheet

VIEWING GLASS FOR VACUUM APPARATUS

TECHNICAL FIELD

This invention is directed to a viewing glass having a transparent pane and a flange and which is useful with vacuum apparatus.

BACKGROUND OF THE INVENTION

Viewing glasses of this general type can be put in place on connecting branches of vacuum apparatus that are equipped with a flange in order to allow visual inspection of certain sections of the vacuum apparatus.

In one such viewing glass, a glass pane is glued to one of the two face ends of a tube section. The other side of the tube section includes a flange that serves to fasten the viewing glass to a flange of the connecting branch of the vacuum apparatus, so as to maintain a vacuum-tight seal. The manufacture of the vacuum-type glass/metal glued connection is complicated. Further, there is the disadvantage that the distance between the glass pane and the inside of the receiving portion of the vacuum apparatus is relatively large as a consequence of the tube section between pane and flange, so that the viewing angle is restricted.

SUMMARY OF THE INVENTION

The present invention relates to a viewing glass having a pane that is arranged directly in the region of the flange and is surrounded by an O-ring for producing a vacuum-tight connection. In a viewing glass according to this invention, the O-ring has the job not only of producing the sealing effect between the flange of the viewing glass and the flange of the connecting branch to which the viewing glass is secured, but also that of sealing the edge of the glass pane toward the outside. Since the glass pane is situated in the immediate region of the flange, the distance between the pane and the inside of the receiving portion of the vacuum apparatus is reduced in comparison to known viewing glasses. It is also advantageous that the glass can be easily placed and is protected against jolts by the O-ring.

It is therefore a primary object of this invention to provide a viewing glass having a transparent pane, and which further is simple to manufacture and allows an enlarged viewing angle into a viewing apparatus.

It is another object of this invention to provide a viewing glass having a sealing surface with a step section, where the step and the edge of the pane are concentric and frustoconical.

It is a further object of this invention to provide a viewing glass with a flange having a centering edge surrounding a sealing surface.

This invention contemplates a viewing glass having a transparent pane between a flange and an O-ring. The flange includes a sealing surface with a concave step. The step has a radially extending section and a roughly axially extending section. The radially extending section is in contact with the O-ring and the pane, and the axially extending section is in contact with the O-ring. The axially extending section of the step has an axial height greater than the thickness of the pane and, as a result of the size relationships among the cross-sectional diameter of the O-ring, the axial height of the step, and the thickness of the pane, the O-ring projects axially out of the sealing surface.

In a preferred embodiment, the O-ring has contact at three sides, namely radially toward the outside with the axially extending step section, radially toward the inside with the outside edge of the pane and laterally with the radially extending step section. When this viewing glass is put in place on the flange of a receiving member, then the O-ring also has contact with the sealing surface of the cooperating flange of the member. The O-ring can perform sealing functions in all of these four contact regions. A glued connection is no longer required.

A further advantageous measure lies in forming that section of the step that extends approximately axially so that it has a frusto-conical shape that tapers away from the radially extending section of the step. This configuration allows the pane to be secured with a clamp with the assistance of the O-ring, and facilitates the manipulation of the viewing glass.

Other objects and advantages of the present invention will be apparent upon references to the accompanying description when taken in conjunction with the following drawings.

DESCRIPTION OF THE PREFERRED EMBODIMENTS

Figure 1:
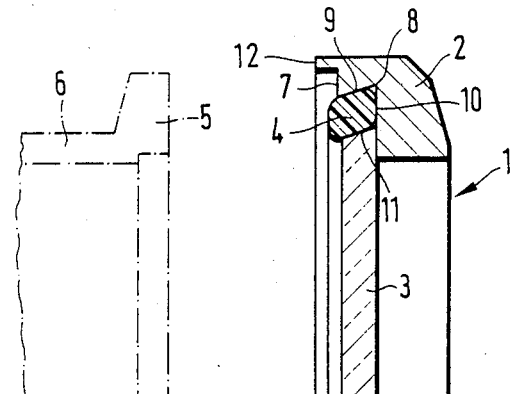
FIG. 1 is a partial section of a viewing glass according to one embodiment of the present invention.

FIG. 1 shows a partial section through a viewing glass incorporating the present invention that includes an annular flange 2, a transparent pane 3 and an O-ring 4 (of, for example, VITON). The connecting branch equipped with a cooperating flange 5 is referenced 6 and is secured to a receiving portion of a vacuum apparatus (not shown).

The annular flange 2 of the viewing glass 1 includes a sealing surface 7 at its face side. The sealing surface is provided with an inside step 8 that has a roughly axially extending section 9 and a radially extending section 10. The O-ring 4 and the pane 3 lie on the radially-extending section. The O-ring 4 surrounds the pane 3 and lies against both the outside edge of the pane 3 as well as against the axially extending section 10 of the step 8.

The axial height of the step 8, the thickness of the pane 3 and the cross-sectional diameter of the O-ring 4 are selected such that the O-ring projects out of the sealing surface 7, and the thickness of the pane 3 is somewhat smaller than the height of the step 8. What this achieves is that the sealing ring is compressed when placed on a cooperating flange 5, whereas the pane 3 remains essentially free of axially directed sealing forces.

As FIG. 1 shows, that section 9 of the step 8 that extends essentially axially has a frustoconical shape that tapers away from the radially extending section 10, and towards the plane of the sealing surface 7. The same is true of the outside edge 11 of the pane 3. These measures assure, first, a clamping fastening of the pane 3 in the flange 2, so that the viewing glass 1 can be manipulated as a unit. Further, the sealing O-ring 4 is surrounded by four contact surfaces of which the surfaces lying respectively opposite one another in pairs extend parallel. The sealing ring is thus in the position to satisfy its sealing function in the region of all four contact surfaces.

The sealing surface 7 is surrounded by an outer edge 12. This has the function of securing a centered seating of the viewing glass 1 on the cooperating flange 5.

Figure 2:
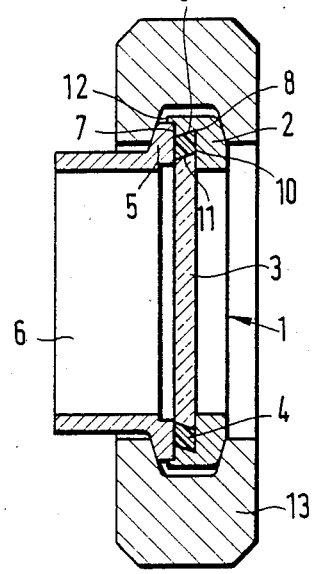
FIG. 2 is a sectional view of the FIG. 1 embodiment, showing it in its assembled state.

FIG. 2 shows the viewing glass 1 of FIG. 1 put in place on the flange 5 of the connecting branch 6. A multi-element (preferably two-element) clamp ring 13 is provided for generating the necessary sealing force, this clamping ring 13 encompassing the flanges 2 and 5. In a known fashion, both flanges 2 and 5 are equipped with conical surfaces on which surfaces of the clamp ring 13 that are likewise conically fashioned lie. The sealing force is produced by contracting the multi-element clamp ring.

Figure 3:
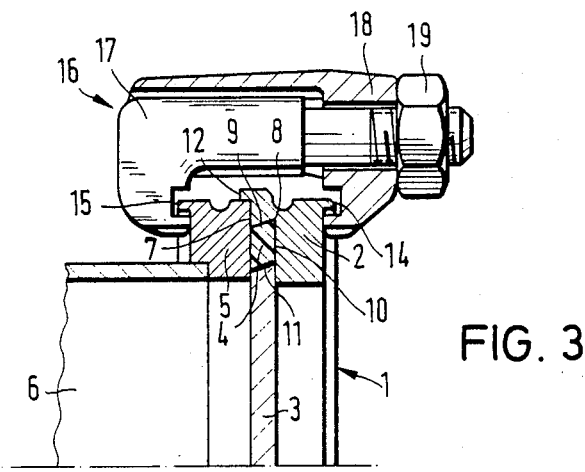
FIG. 3 is a partial section of a second embodiment of the present invention.
Figure 4:
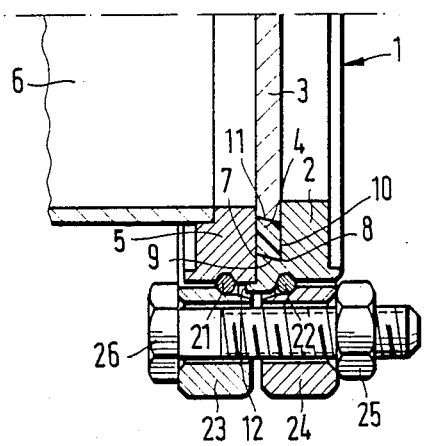
FIG. 4 is a partial section of a third embodiment.

FIGS. 3 and 4 each show a viewing glass 1 of the invention having different flange configurations. Both flanges 2 and 5 include an outside edge 14, or respectively, 15 at their sides lying opposite their sealing surfaces. Components common to all of the illustrated embodiments are shown with like reference numerals. In the exemplary embodiment of FIG. 3, a plurality of mushroom head anchor screws 16 that are arranged distributed over the circumference have parts 17 and 18 that are displaceable relative to one another in axial direction cooperating with edges 14 and 15. An axially directed sealing force is produced by tightening nuts 19.

In the exemplary embodiment of FIG. 4, the flanges 2 and 5 are surrounded by clamp rings 21 and 22 arranged in grooves. The union rings 23 and 24 are supported on these clamp rings. A coaxially directed sealing force is produced by compressing the rings 23 and 24 with the bolt 26 and the nut 25.

Although this invention has been illustrated and described in connection with this particular embodiment, it will be apparent to those skilled in the art that various changes may be made therein without departing from the scope and spirit of the invention as set forth in the appended claims.

We claim:

1. A viewing glass for a vacuum apparatus comprising the following:
   a transparent pane having an outer edge;
   a first flange in which said pane is mounted;
   a second flange cooperating with said first flange to mount said pane therebetween;
   an O-ring surrounding said pane and mounted between said pane and said first flange to produce a vacuum-tight seal therebetween, said O-ring having a cross-sectional profile resembling a parallelogram;
   wherein said first flange comprises a sealing surface including a concave step having a substantially axially extending section and radially extending section;
   wherein said substantially axially extending section is in direct contact with said O-ring;
   wherein said radially extending section is in direct contact with said O-ring and said pane; and
   wherein said concave step of said first flange, said second flange, and said outer edge of said pane cooperate to form a cross-sectional parallelogram corresponding to said cross-sectional profile of said O-ring.

2. The viewing glass of claim 1, further wherein the substantially axially extending section of the step has an axial height greater that the thickness of said pane.

3. A viewing glass of claim 1, wherein said O-ring has an axial extent, in an uncompressed state of said O-ring, that is greater than the axial extent of said axially extending section of said first flange.

4. The viewing glass of claim 3, further wherein the substantially axially extending section of said step is frustoconical and diminishes in circumference in a direction away from the radially extending section of the step.

5. The viewing glass of claim 4, further wherein said pane has a frustoconical outside edge concentric with and corresponding to the substantially axially extending section of said step.

6. The viewing glass of claim 5, further wherein said flange comprises a centering edge surrounding said sealing surface.

7. A viewing glass for a vacuum apparatus comprising the following:
   a transparent pane having an outer edge;
   a first flange including a concave step and in which said pane is mounted;
   a second flange having a sealing surface cooperating with said concave step of first flange to mount said pane therebetween;
   an O-ring having a cross-sectional profile resembling a parallelogram;
   wherein said concave step of said first flange, said sealing surface of said second flange, and said outer edge of said pane cooperate to form a cross-sectional parallelogram corresponding to said cross-sectional profile of said O-ring.

8. A method of mounting a transparent pane, said method comprising the following steps:
   providing a mounting flange including a concave step having a substantially axially extending section and a radially extending section;
   providing an O-ring having a cross-sectional profile resembling a parallelogram, said O-ring having an axial extent, in an uncompassed state of said O-ring, that is greater that the axial extent of said axially extending section of said mounting flange;
   providing a cooperating flange corresponding in size to said mounting flange;
   placing said O-ring and said pane in said mounting flange; and
   securing said cooperating flange to said mounting flange to compress said O-ring, such that the axial extent of said O-ring is substantially equal to the axial extent of said axially-extending section of said mounting flange, and such that said O-ring retains its parallelogram cross-sectional profile.

* * * * *